United States Patent
Cato

(10) Patent No.: US 7,499,976 B2
(45) Date of Patent: Mar. 3, 2009

(54) WARNING AND AVOIDANCE OF SENDING EMAIL MESSAGES TO UNINTENDED RECIPIENTS

(75) Inventor: Robert Thomas Cato, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 741 days.

(21) Appl. No.: 10/856,086

(22) Filed: May 28, 2004

(65) Prior Publication Data
US 2005/0278430 A1   Dec. 15, 2005

(51) Int. Cl.
G06F 15/16    (2006.01)
G06F 15/173   (2006.01)

(52) U.S. Cl. .................. 709/207; 709/204; 709/205; 709/206; 709/223; 709/224

(58) Field of Classification Search ......... 709/204–207, 709/245, 223–224
See application file for complete search history.

(56) References Cited

U.S. PATENT DOCUMENTS

| | | | | |
|---|---|---|---|---|
| 6,671,718 | B1* | 12/2003 | Meister et al. | 709/206 |
| 7,149,778 | B1* | 12/2006 | Patel et al. | 709/206 |
| 7,320,019 | B2* | 1/2008 | Malik | 709/206 |
| 2002/0010745 | A1 | 1/2002 | Schneider | |
| 2002/0042815 | A1 | 4/2002 | Salzfass et al. | |
| 2002/0049610 | A1 | 4/2002 | Gropper | |
| 2002/0065891 | A1* | 5/2002 | Malik | 709/206 |
| 2002/0087647 | A1 | 7/2002 | Quine et al. | |
| 2002/0091773 | A1 | 7/2002 | Chowdhry et al. | |
| 2002/0103932 | A1 | 8/2002 | Bilbrey et al. | |
| 2003/0005058 | A1* | 1/2003 | Sorotzkin | 709/206 |
| 2003/0023736 | A1* | 1/2003 | Abkemeier | 709/229 |
| 2004/0103162 | A1* | 5/2004 | Meister et al. | 709/206 |
| 2004/0221016 | A1* | 11/2004 | Hatch et al. | 709/207 |
| 2005/0188031 | A1* | 8/2005 | Zandt | 709/206 |
| 2007/0106741 | A1* | 5/2007 | Christoff et al. | 709/206 |
| 2007/0214223 | A1* | 9/2007 | Morikubo | 709/206 |
| 2007/0294428 | A1* | 12/2007 | Guy et al. | 709/245 |
| 2008/0104190 | A1* | 5/2008 | Morreale et al. | 709/206 |
| 2008/0168142 | A1* | 7/2008 | Chung | 709/206 |

FOREIGN PATENT DOCUMENTS

WO    WO 02/13069 A1    2/2002

* cited by examiner

*Primary Examiner*—Nathan J Flynn
*Assistant Examiner*—Joshua Joo
(74) *Attorney, Agent, or Firm*—Dillon & Yudell LLP

(57) ABSTRACT

An unintended recipient initiates a reply to the sender and all other recipients of an original email. The reply contains a "hot button" feature in the email client application to enable the email client application of the recipient of the reply to auto designate the unintended recipient in the recipient of the reply's address book. When the recipient of the reply's email client application creates a future email, it is determined if the recipient of the future email has been designated as a potential unintended email recipient. If so, the email client generates a notification that the future email recipient potentially is an unintended recipient of the future email. The designation enables notification means for avoidance of initiating future erroneous emails addressed to an unintended recipient.

6 Claims, 5 Drawing Sheets

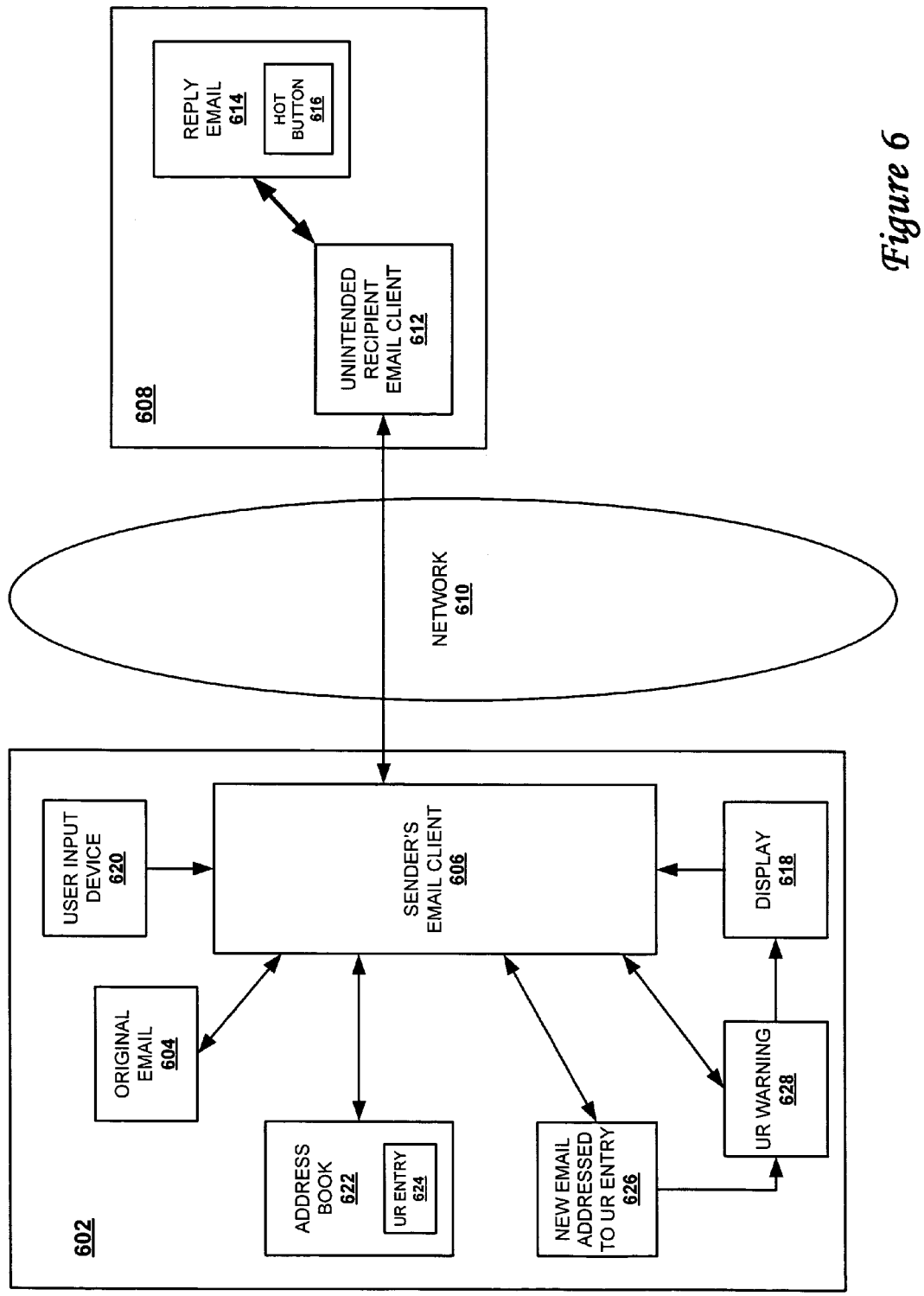

WARNING AND AVOIDANCE OF SENDING EMAIL MESSAGES TO UNINTENDED RECIPIENTS

BACKGROUND OF THE INVENTION

1. Field of the Invention

The present invention relates in general to data processing systems, and in particular to systems and programs for managing email communications in client systems. Still more particularly, the present invention relates to data processing systems, methods and program products, including electronic mail systems, for informing an email message sender and other recipients that an email message has possibly been addressed to or has been sent to an unintended recipient.

2. Description of the Related Art

During the past decade, electronic mail ("e-mail") has become an indispensable tool for facilitating business and personal communications. Through computer networking systems such as local-area networks (LAN), wide-area networks (WAN), and the world-wide-web (WWW), network users can send and receive notes, messages, and letters to communicate with others who are in the same office or perhaps in other locations across the world. More specifically, one conventional manner of producing and sending an email message is to use an email client program (mail client) which combines the functionality of a text editor with a messaging system.

Delivery is solely dependent upon the email message's destination address. This address is comprised of two distinct and functionally different parts, namely the address name and the domain. The domain function of the address is the functional equivalent of a "zip code" and allows a message to be delivered to a specific mail server that is responsible for receiving and storing mail messages for a number of mail clients. The name portion of the address permits the receiving mail server to correctly store the message for retrieval from the particular mail program of the receiver. Typically, the messages are stored at the receiver's mail server until the receiver's email program requests the messages. Some receiver email programs are designed so the program requests and retrieves mail regularly. As is well known, the email address that is supplied by a message sender must be in particular format for successful transmission. The first part of the address is the recipient's user name, followed by a "@" sign, and then a host name or a domain name which identifies where the recipient has an Internet mail account.

In the conventional transmission of an email message, the sender's email client transmits a message to the sender's outgoing mail server. Before the outgoing mail server can send the message to its destination, it must obtain an actual Internet Protocol (IP) address for the recipient's incoming mail server. In other words, the domain portion of the address must be converted into an IP address. In order to obtain the correct IP address for the requested domain, the outgoing mail server communicates with a domain name server (DNS). The DNS will either respond with a destination IP address for the domain's mail server or it will respond that the domain cannot be found. This is a first type of addressing error that can cause a message to be undeliverable. Once the sender's outgoing mail server receives a valid IP address from the DNS, it can and does transmit the message across the Internet to the recipient's incoming mail server. This incoming mail server must then validate the name in the address field. If the name does not exist within that domain, then the recipient's incoming mail server typically causes an error message to be sent to the sender's incoming mail server to inform the sender that the "person" does not exist at that domain. This is the second type of addressing error that causes a message to be undeliverable. If the recipient's incoming mail server correctly validates the name in the address field of the message, then the message is stored in a specific location until the recipient receives it.

It is a relatively common mistake for a user to forget or misspell a user name, host name, or domain name in an email address for an email communication. If such user name, host name, or domain name is invalid, the error is detected during transmission and an error message is generated to be transmitted back to the sender. However, in some instances, the user may inadvertently or unintentionally provide a valid user name, host/domain name, in which case, the user may never be notified of the error. The email will be transmitted in the usual course from the user's email server, through the domain name server, on to the Internet, and then received by a valid but unintended recipient.

This problem may be partially alleviated by the use of email software applications including an address directory to assist the user in supplying email addresses when creating email communications. The user can generate entries by supplying names, addresses, telephone and facsimile numbers, email addresses, and other pertinent information into a table. The user can later refer to the directory when composing an email communication. Some email software applications incorporate an automatic email address generator, which, when the user provides the first few characters of an email address, suggests a correct corresponding email address from the list that has been preprogrammed into the directory. Although such an email address directory alleviates some of the problems outlined above by loading the recipient address automatically into the email message, such a system does not solve the problem of entering an unintended recipient the first time that an email message is to be sent to a particular addressee. Further complicating the problem, the address directory itself may contain a valid but unintended recipient contact that perpetuates the problem of sending an email message to an unintended recipient repeatedly. Accordingly, there is a need for a method, system and program for automatically generating a warning when a probable unintended recipient is entered into the recipient field of an email message. Further, there is a need for a system, method and program for informing a message sender when a message has been sent to an unintended recipient.

SUMMARY OF THE INVENTION

In accordance with the present invention, improved methods, systems and articles of manufacture for avoiding transmission of an email to an unintended recipient are disclosed. In one embodiment of the present invention, an email client application creates an email within a data processing system connected to a network, wherein the email is addressed to a recipient within the network. If it is determined that the recipient has been designated as a potential unintended email recipient, the email client generates a notification to the sender and the people on copy that the recipient potentially is an unintended recipient of the email.

All objects, features, and advantages of the present invention will become apparent in the following detailed written description.

BRIEF DESCRIPTION OF THE DRAWINGS

This invention is described in a preferred embodiment in the following description with reference to the drawings, in which like numbers represent the same or similar elements, as follows:

FIG. 6 depicts one exemplary network arrangement of hardware and software components for warning of an email message addressed to an unintended recipient, in accordance with the preferred embodiment of the present invention.

DETAILED DESCRIPTION OF PREFERRED EMBODIMENTS

The preferred embodiment is a method, system and program for warning a sender of an email message, prior to the sender sending an email message to an unintended recipient, when the addressed recipient is possibly an unintended recipient. The method, system and program of the preferred embodiment further provides a mechanism for an unintended recipient to inform the email sender that the recipient was an unintended recipient.

Figure 1:
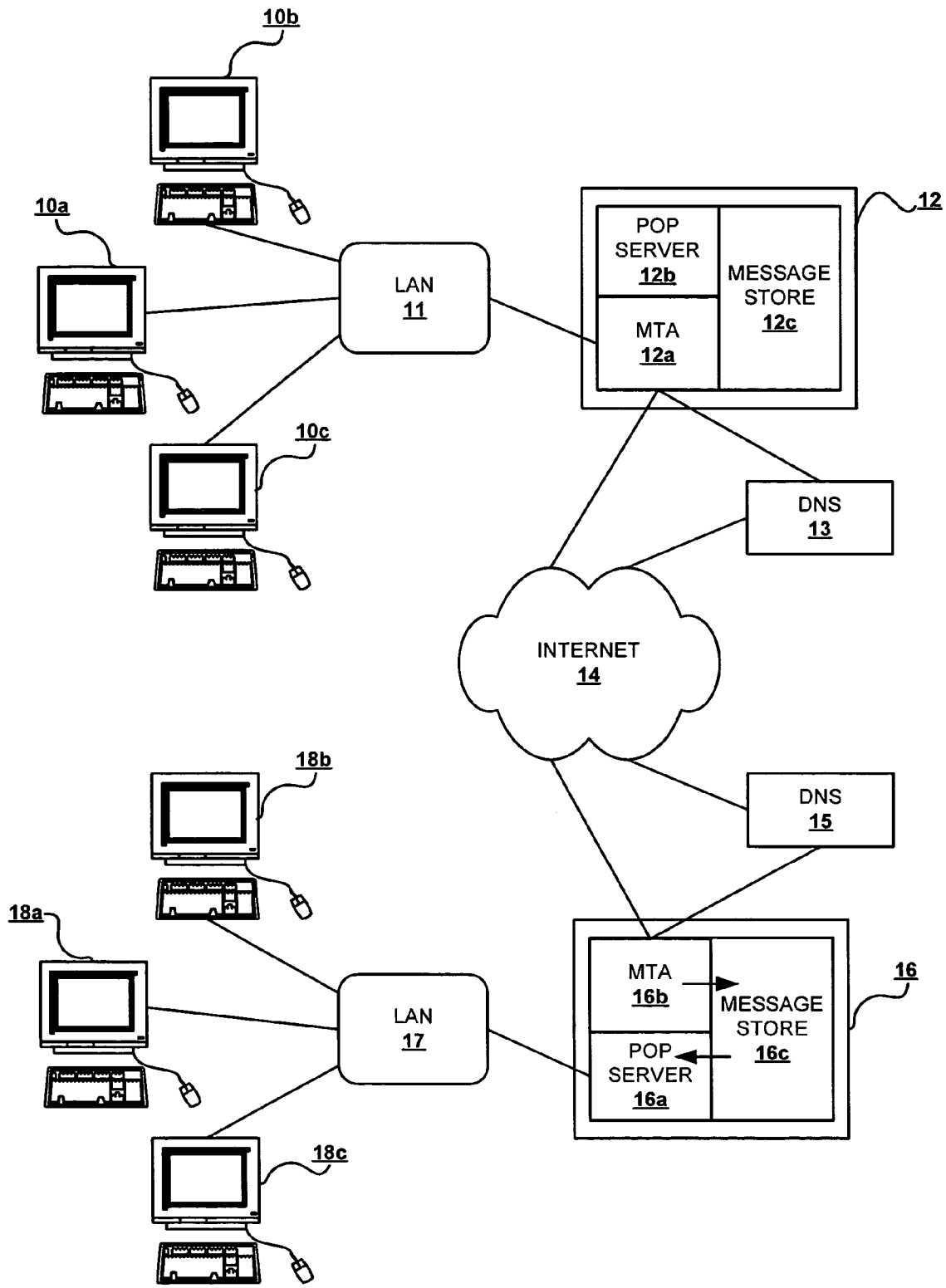
FIG. 1 illustrates a pictorial representation of a network of an email communication system where the present invention may be advantageously utilized.

FIG. 1 illustrates a pictorial representation of a network of an email communication system where the present invention may be advantageously utilized. Computers 10a-10c are connected through a local area network (LAN) 11 to email communication system 12, which can send email communications to any of computers 18a-18c through email communication systems 16 and local area network (LAN) 17. Email communication systems 12 and 16 include Mail Transport Agent (MTA) servers 12a, 16a, Post Office Protocol (POP), servers 12b, 16b, and Message Store 12c, 16c. The email communications servers 12 and 16 are also connected to respective domain name servers (DNS) 13, 15.

When an e-mail communication is transmitted according to the Simple Mail Transport Protocol (SMTP), it is first divided into three components: the "mail from:" address; the recipient address list; and the data portion of the message. After a user of computer 10c prepares an e-mail communication and sends the email across the LAN 11, it is sent to the MTA 12, which accepts e-mails for delivery. The MTA then separates the address information from the data portion of the email. The MTA parses the envelope to determine whether to route the message to an external network or store the message in Message Store 12c for access by another computer connected to the LAN 11. The MTA "postmarks" the e-mail by adding routing data to the header before storing the message.

If the e-mail is to be sent to a another user on a different mail system, the MTA 12 next determines the domain for the intended recipient through the DNS 13, which queries the DNS 15 through the Internet. Upon receiving the domain information, MTA 12 transmits the e-mail communication to the MTA 16b, which is waiting to accept e-mail. The MTA 16b then stores the received e-mail in Message Store 16c. Later, a user on computer 18a logs in to the e-mail system and connects to the POP server 16a, which determines if there is new mail to download. The POP server 16a retrieves the e-mail communication from the Message Store 16c and transmits the e-mail through the LAN 17 to the user.

Figure 2:
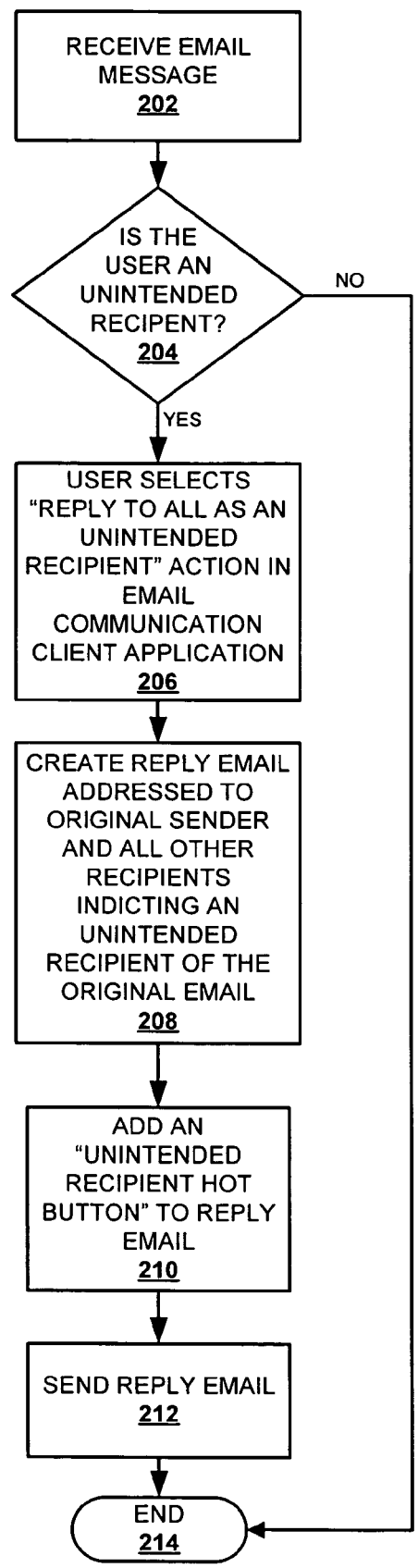
FIG. 2 shows a flow diagram of a process for unintended recipient notification, in accordance with the preferred embodiment of the present invention.

With reference now to FIG. 2, there is depicted a flow diagram of a process for unintended recipient notification, in accordance with the preferred embodiment of the present invention. The process is implemented in an email communications client within a recipient's computer systems, and begins when an email message is received at the recipient's (user's) computer system as shown in step 202. The process passes to step 204 where the user determines if the user is an unintended recipient of the received email. For example, the message recipient may determine that the message sender had intended the email to be sent to someone with a similar name and/or email address. This process step 204 could also be performed by the computer in a preferred embodiment. In an alternative preferred embodiment, the email client on the user's computer would include logic to search the messages for first and last names of individuals. If there is a mismatch between the computer user's name and those names identified within the message, the email client would inform the user that the message may have been unintentionally addressed to the user. If the determination at step 204 is that the user was the intended recipient of the email message, the process terminates at step 214. If it is determined at step 204 that the user is an unintended recipient of the email message, the process proceeds to step 206 of the user selecting an "Initial Reply to All as in Unintended Recipient" action or menu command in the email communication client application. Step 208 depicts creating a reply email addressed to the original sender of the email message received at step 202 and optionally addressing or copying the reply email to all other recipients of the original email message received at step 202. This reply email would explain that an unintended recipient received the original email.

Figure 3:
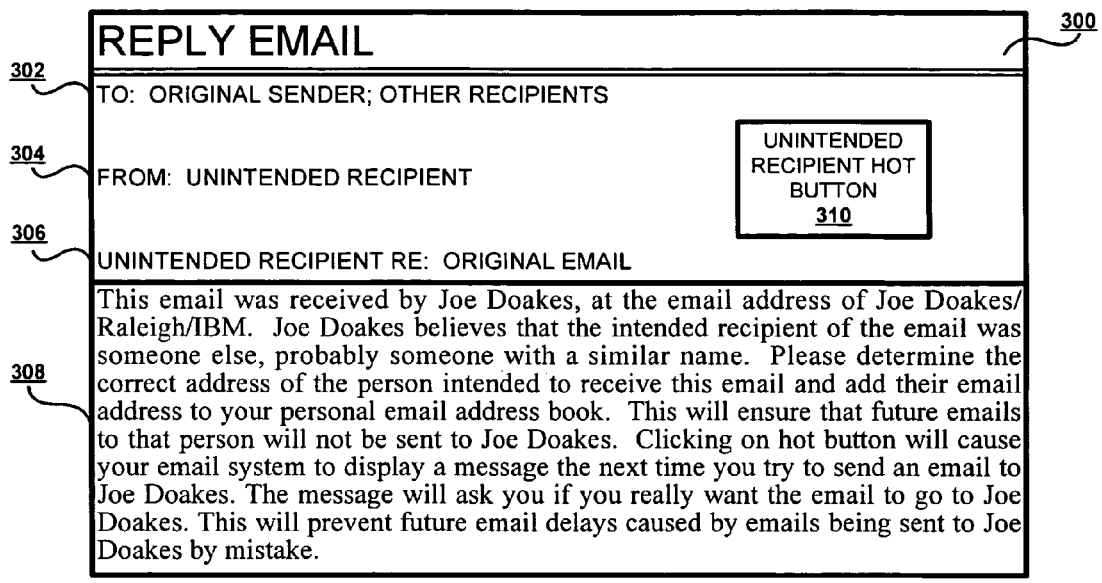
FIG. 3 depicts an example of a reply email indicating an unintended recipient, in accordance with the preferred embodiment of the preferred invention.

FIG. 3 depicts an example of a reply email indicating an unintended recipient, in accordance with the preferred embodiment of the preferred invention. Reply email 300 includes a "To:" line 302 indicating the addressee of the reply email, which in accordance with the preferred process would be the original sender of the email message received at step 202 and all the recipients of that message. Reply email 300 includes a "From:" line 304 identifying the unintended recipient of the original email message received at 202. In this case, the unintended recipient is the user of the computer system running process. Reply email 300 includes a subject line 306 referencing the original email, and a text body 308 providing a message to the original sender and other recipients. This standard text in body 308 would be automatically inserted into reply email 300 when the reply email is created at step 208. For example, the standard text could say "This email was received by Joe Doakes, at the email address of Joe Doakes/Raleigh/IBM. Joe Doakes believes that the intended recipient of the email was someone else, probably someone with a similar name. Please determine the correct address of the person intended to receive this email and add their email address to your personal email address book. This will ensure that future emails to that person will not be sent to Joe Doakes.

Clicking on hot button will cause your email system to display a message the next time you try to send an email to Joe Doakes. The message will ask you if you really want the email to go to Joe Doakes. This will prevent future email delays caused by emails being sent to Joe Doakes by mistake." As can further be seen in FIG. 3, reply email 300 further includes a "Hot Button" 310, for example entitled the "Unintended Recipient Hot Button" as seen in reply email 300. Hot Button 310 may be engaged by the original sender and other recipients addressed at line 302 upon receipt of the reply email 300. The functionality of Hot Button 310 will be described in more detail in conjunction with FIGS. 4 and 5 below.

Referring back now to FIG. 2, following step 208 at step 210, the email client will optionally add an "Unintended Recipient Hot Button" to the reply email 300 as directed by the user of the system. At step 212, there is depicted the step of the user sending the reply email to the original sender and other recipients. Thereafter, the process ends at step 214.

Figure 4:
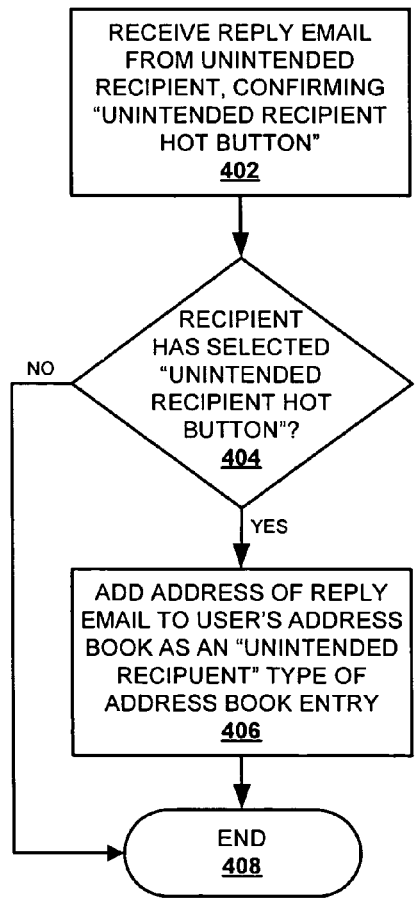
FIG. 4 depicts a flow diagram of a process of updating the unintended recipient system on an email client, in accordance with the preferred embodiment of the present invention.

With reference now to FIG. 4, there is shown a flow diagram of a process of updating the unintended recipient system on an email client, in accordance with the preferred embodiment of the present invention. The process begins as shown at step 402 when the user's email communications client executing within the user's data processing system receives a reply email from an unintended recipient of an original email. The reply email is a reply to an email message originally sent by the user or previously received by the user as a recipient addressee of a previous email message. The reply email received at step 402 contains an "Unintended Recipient Hot Button" 310 and body text 308 explaining that the sender of the reply email 300 had previously been the unintended recipient of the original email message. The process then proceeds to the step 404, where the user's system determines if the recipient of the reply email selected the "Unintended Recipient Hot Button" (310) displayed within the reply email (300). In an alternative preferred embodiment, an unintended recipient initiates a reply email 300 to an original email containing a "Unintended Recipient Notification" feature set in the email client application, and the receiving email client application will then auto designate the unintended recipient in the sender's address book, assuming the user has set this auto feature in the options menu of the application. If the user has not selected the hot button, the process ends at step 408. However, if the recipient selects the "Unintended Recipient Hot Button," the process proceeds to step 406 of adding the address of the sender of the unintended recipient's reply email to the user's address book integrated within the email client. This address book entry would be saved as a special address-book entry specifying the address as belonging to an unintended recipient. Thereafter, the process ends at step 408.

Figure 5:
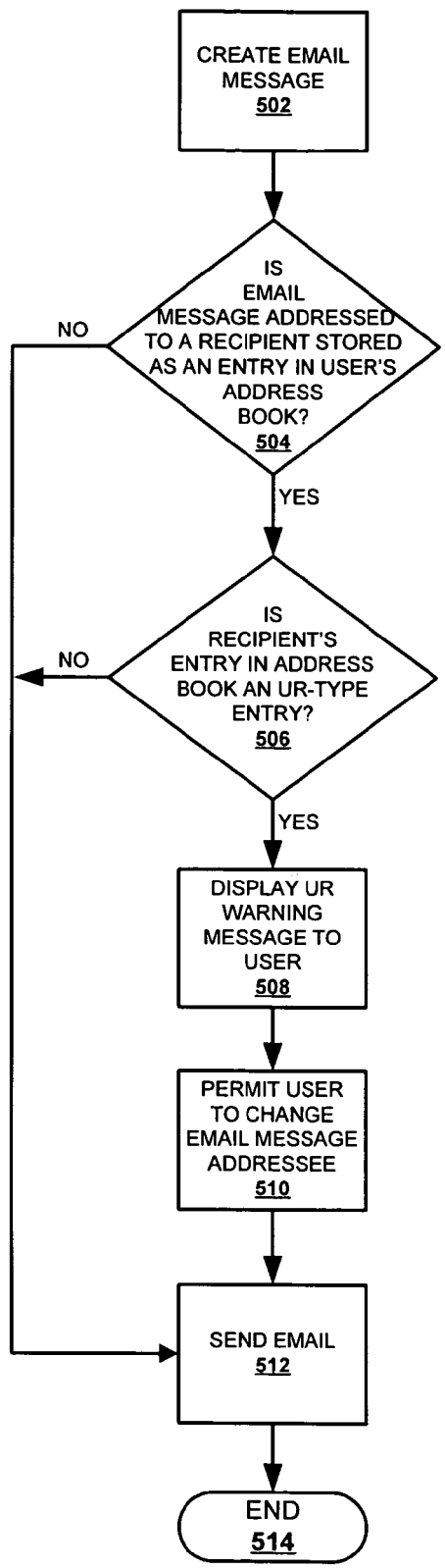
FIG. 5 depicts a flow diagram of a process of warning a user when an email has been addressed to an unintended recipient, in accordance with the preferred embodiment of the present invention.

With reference to FIG. 5, there shown a flow diagram of a process of warning a user when an email has been addressed to an unintended recipient, in accordance with the preferred embodiment of the present invention. The process begins at step 502 when an email message is created within the email client of the user's data processing system. The process proceeds to step 504 of determining if the email message has been addressed to a recipient stored as an entry in the user's electronic address book. If not, the process proceeds to step 512 of sending the email to the addressed recipient. If the email message has been addressed to a recipient stored in the address book, the process proceeds to step 506 of determining of whether the recipient's entry in the address book is an "Unintended Recipient" ("UR"-type) of address book entry. If the recipient's address book entry is not a UR-type entry, the process proceeds to step 512 of sending the email to the addressed recipient, and then ends at step 514. If the recipient is stored in the address book as a UR-type entry, the process proceeds to step 508 of displaying a "UR" warning message to the system user. The UR-type address book entry would flag the email client system as a "prompt before sending email" type of entry that causes a prompt to be displayed to the user prior to the sending of any emails to such UR-type address entry. For example, a dialog box would pop up on the display of the user in front of other display content or windows notifying that the user had previously stored the addressed recipient in the address book as a UR-type. For example, the UR warning message would say "an email sent to this address previously was not received by the person intended. The person that should have been sent the email was Joseph P. Doakes. Do you want to continue sending this message or change the addressee of this email?" The process then proceeds to step 510 of permitting the user the opportunity to change the email message addressee field(s) prior to sending the email. Thereafter, the process proceeds by sending the email at step 512, and then ends at step 514.

With reference now to FIG. 6, there shown one exemplary network arrangement of hardware and software components for warning of an email message addressed to an unintended recipient, in accordance with the preferred embodiment of the present invention. Data processing system 602 is utilized by a sender of an original email 604, which is transmitted by the sender's email client application 606, executing within data processing system 602. Included as one of the recipients addressed within email 604 is the user of data processing system 608. Sender's email client 606 sends the original email 604 over network 610 to be received at data processing 608 by the unintended recipient email client 612 executing within data processing system 608. Unintended recipient email client 612 receives a command from the user of data processing system 608 to generate an unintended recipient reply email 614 addressed to the original sender and people on copy of the original email at data processing system 602. Reply email 614 includes body text notifying the email recipient that a previous email sent to the unintended recipient email client 612 was not intended for the user of data processing system 608.

Upon receipt at data processing system 602, reply email 614 is displayed for the user of data processing system 602 by the sender's email client 606 on display 618. Upon the selection of Hot Button 616 displayed within display 618 by the user of data processing system 602 using user input device 620, the sender's email client 606 generates a unique unintended recipient type entry (UR entry 624) within the user's address book 622. Thereafter, if the user of data processing system 602 generates a new email addressed to an addressee contained within address book 622, sender's email client 606 determines if the addressee entry is a UR entry 624. When such a new email addressed to a UR entry 626 is generated by sender's email client 606, sender's email client 606 prompts the user of data processing system 602 by generating a UR warning 628 that is displayed on display 618 to prompt the user before sending the new email address to UR entry 626. Thereafter, the user is prompted to provide a user input through user input device 620 to proceed with sending the email 626 or change the address field within email 626 to an addressee other than UR entry 624.

What is claimed is:

1. A method for avoiding transmission of an email to an unintended recipient, the method comprising:

creating an email within a data processing system connected to a network, wherein the email is addressed to one or more recipient(s) within the network;

accessing an electronic address book to determine if an entry in the electronic address book corresponding to a recipient among the one or more recipients indicates the recipient is a potential unintended recipient;

determining that the recipient has been previously designated as a potential unintended email recipient based on a reply email from the recipient to a previously-issued email, wherein the recipient provided a hot button feature within the reply email, and wherein the hot button feature triggered the electronic address book to auto designate an address entry created for the recipient within the electronic address book as an unintended recipient;

generating a specific notification prior to sending the email, indicating that the recipient potentially is an unintended recipient of the email in response to the determining that the recipient is a potential unintended email recipient with the auto designation as an unintended recipient; and prompting, within the specific notification, for a removal of the unintended recipient as a recipient of the email.

2. The method according to claim 1, further comprising creating the entry in response to a determination that a previous email sent to the recipient had been unintentionally addressed to the recipient, wherein said determination is triggered by receipt of the hot button feature within the reply email from the recipient.

3. The method according to claim 1, wherein:
the method of claim 1 is performed by an email client executing within the data processing system; and
the notification is a message displayed on a display device within the data processing system.

4. The method according to claim 1, further comprising the step of enabling the email to be addressed to one or more other recipients instead of or in addition to the recipient in response to the notification.

5. The method according to claim 1, further comprising:
receiving a command resulting from user input within a reply email received at the data processing system, wherein the reply email is generated by the recipient in response to receiving an email that is addressed to the recipient, and the recipient is determined to not be an intended recipient of the email; and creating an entry associated with the recipient in an electronic address book that indicates the recipient had previously been the unintended recipient of an email.

6. The method according to claim 5, further comprising:
in response to receiving a sent email from a remote sender, determining when the sent email was correctly addressed to a recipient address of a user of the email client by (a) searching the sent email message and other addresses for information identifying the recipient address as being a correct or an incorrect address within the sent email and (b) receiving a selection of a hot button feature indicating that the email was not intended to be sent to the recipient address; and when the recipient address is determined to be an incorrect address within the sent email:
generating a notification that the email was not intended to be received by the recipient; and prompting for providing a reply to the remote sender indicating that the sent email was sent to an unintended recipient;

receiving a selection to provide a reply email with an indication that the sent email was sent to an unintended recipient identified as the recipient address; and forwarding the reply email to the remote sender tagged with the hot button feature to enable the remote sender's email client to update an address book of the remote sender's email client with an indication that the recipient address corresponds to a recipient that is potentially an unintended recipient.

* * * * *